INVENTOR.
FREDERICK H. GARDNER

Dec. 3, 1963    F. H. GARDNER    3,112,980
IN-FLIGHT AIRCRAFT ANGLE OF ATTACK CALIBRATOR
Filed Sept. 18, 1959    5 Sheets-Sheet 3

INVENTOR.
FREDERICK H. GARDNER
BY
John A. Duffy
AGENT

INVENTOR.
FREDERICK H. GARDNER

Dec. 3, 1963    F. H. GARDNER    3,112,980
IN-FLIGHT AIRCRAFT ANGLE OF ATTACK CALIBRATOR
Filed Sept. 18, 1959    5 Sheets-Sheet 5

INVENTOR.
FREDERICK H. GARDNER
BY
AGENT 3,112,980
IN-FLIGHT AIRCRAFT ANGLE OF
ATTACK CALIBRATOR
Frederick H. Gardner, Long Beach, Calif., assignor to
North American Aviation, Inc.
Filed Sept. 18, 1959, Ser. No. 840,903
3 Claims. (Cl. 346—107)

This invention relates to aerodynamic characteristics measuring apparatus and more particularly to apparatus for determining the angle of attack of an aircraft in flight as a function of the zero lift coefficient.

One of the aerodynamic characteristics of an airplane necessary to define performance is the angle of attack, which is the angle between the velocity vector line and the fuselage reference line of the airplane. In order to accurately determine the angle of attack during operation, the airplane's computer must receive certain information concerning the particular characteristics of the airplane which affect the angle of attack. One such characteristic, known as the coefficient of lift, is largely dependent on the angle between the wing plane and the fuselage reference line. This angle appears in the computer as a bias or correction signal in the computation of the lift coefficient.

Military airplanes which launch rockets and missiles require an accurate meansurement of the lift characteristic of the aircraft in order to provide an accurate aiming of the rockets by the airplane fire control system. In the process of conducting engineering flight tests on a new airplane the shape of the curve which defines the relationship between the coefficient of lift and the angle of attack is ordinarily determined with suitable accuracy to described the performance of the production airplanes. However, the zero lift coefficient, i.e., the value of the coefficient of lift when the angle of attack is equal to zero, is dependent upon the assembly of wings to the fuselage and upon twist in the wings. Even though the wings of all of the planes may be assembled in the same production jig, the variations of rivet tensions and component tolerances will cause them to assume slightly different shapes. Consequently, the angle of attack at zero lift coefficient is required to be determined in order to calibrate a fire control system properly prior to delivery to the customer. Should an airplane experience severe gusts or hard landing during its service life, it is possible that the coefficient of lift characteristic might be shifted, thus necessitating re-calibration in service. Normal aging effects in an airplane may also have an influence on this characteristic.

In accordance with the device of this invention apparatus is provided which when installed in an airplane measures and records the airplane's stabilized pitch attitude $\epsilon$ during unaccelerated flight conditions. Gravity reference means with proper optical characteristics indicate the gravity vector for the airplane in flight. Photographic means associated with suitable recording means produce an image on a photosensitive paper in the recording means which is an exact reproduction of the gravity indication of the gravity reference means. The recording means is associated with suitable automatic timing means so that a number of measurements of the stabilized pitch attitude of the airplane in flight may be recorded during one flight. The stabilized pitch attitude data obtained during unaccelerated horizontal flight provides a measure of the true angle of attack. By simple calculation according to relationships well known the coefficient of lift characteristic may readily be obtained utilizing the true angle of attack information. The entire apparatus is completely self-contained and needs only minimum attention by the pilot. The device is readily adaptable for temporary installation in an airplane without interfering with permanent production installations. The device may be installed in the cockpit within easy access to the pilot.

This invention provides an accurate self-contained flight test instrument for providing a measure for the airplane's true angle of attack during known flight conditions utilizing a combination of flight test apparatus installed in the plane and computation techniques. The correct angle of attack for a particular airplane may be accurately computed for actual flight conditions.

It is therefore an object of this invention to provide an improved flight recording instrument.

It is another object of this invention to provide a device for measuring aerodynamic characteristics.

It is still another object of this invention to provide a flight recording instrument for determining the angle of attack of an airplane as a function of the zero lift coefficient.

It is a further object of this invention to provide an in-flight determination of the aircraft's true angle of attack for unaccelerated horizontal flight.

It is another object of this invention to provide a flight recording instrument for measuring the angle between the gravity vector and the perpendicular to the fuselage reference line of an aircraft in flight.

Other objects of the invention will become apparent from the accompanying descriptions taken in connection with the accompanying drawings in which FIG. 1 is a graph illustrating a typical plot of lift coefficient as a function of the natural angle of attack;

Figure 1:
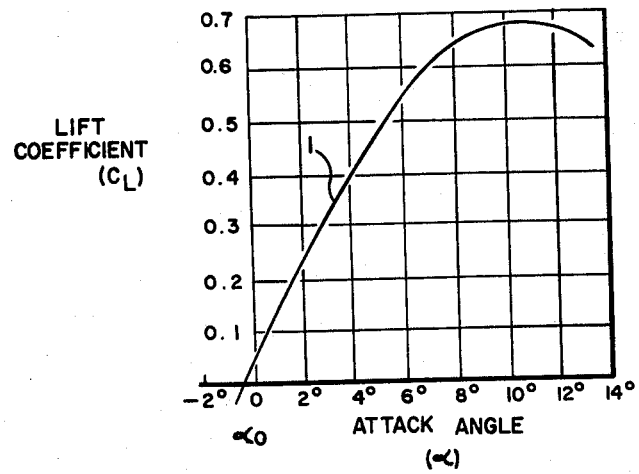

In order to more fully understand the principles embodied in the angle of attack calibrator of this invention, reference will first be made to the underlying aerodynamic principles which govern the device of this invention. In FIG. 1 there is shown a plot of the lift coefficient ($C_L$) as a function of the angle of attack ($\alpha$) for a typical airplane at a preselected Mach number. The slope of the curve denoted by numeral 1 may be determined with suitable accuracy by standard production flight test methods. However, the X axis intercept, $\alpha_0$, which is the angle of attack when the coefficient of lift (and the actual lift force) is equal to zero, is also required in order to provide proper calibration of the fire control system incorporated in the aircraft. This intercept, or angle of attack for zero lift as it is commonly called, tends to vary from one airplane to another during production as well as during the lifetime of a single plane. Accordingly, it is desirable to establish one point on a known curve of the coefficient of lift versus the angle of attack for a given flight condition. Finding this one point then establishes the proper location of the entire known curve including the zero intercept ($\alpha_0$).

From known principles of aerodynamics it has been found that the equation which establishes the curve shown in FIG. 1 is $$C_L = \left(\frac{\delta C_L}{\delta \alpha}\right)(\alpha - \alpha_0) \qquad (1)$$

where $C_L$ is the coefficient of lift, $\alpha$ is the angle of attack, $$\left(\frac{\delta C_L}{\delta \alpha}\right)$$

is the slope of the lift characteristic, and $\alpha_0$ is the angle of attack when $C_L$ is equal to zero. This equation may be found, for example, in "Principles of Aerodynamics" by James H. Dwinnell, 1st edition 1949, published by the McGraw-Hill Publishing Company on page 108. It is also well known that the equation which expresses the lift characteristic of an airplane is $$L = C_L S q \qquad (2)$$

where $L$ is the lift force measured normal to the relative wind, $S$ is the area of lifting surface, and $q$ is the dynamic pressure. When an airplane is in trimmed flight with a relative wind direction angle $\gamma$ and the vertical forces in balance, and the angle of attack $\alpha$ is small so that thrust times $\sin \alpha$ is relatively negligible, $L$ is equal to $W$ (the weight of the airplane) times $\cos \gamma$, where the angle $\gamma$ is very small so that $\cos \gamma$ is approximately equal to one. Substituting Equation 2 in Equation 1 and applying the equality $L=W$, since $\cos \gamma$ is approximately equal to one, we arrive at Equation 3 where $C_{L\alpha}$ is a symbol for $$\frac{\delta C_L}{\delta \alpha}$$

$$\alpha_0 = \alpha - \frac{W}{Sq(C_{L\alpha})} \qquad (3)$$

Therefore, it follows that for a given airplane where $C_{L\alpha}$ is known insofar as the slope of curve 1 of FIG. 1 is concerned, where the airplane weight $W$ is known, where $S$ is a known constant, and where $q$ may be determined from known air speed (Mach number) and altitude, $\alpha_0$ may be obtained if $\alpha$ can be measured.

Figure 2:
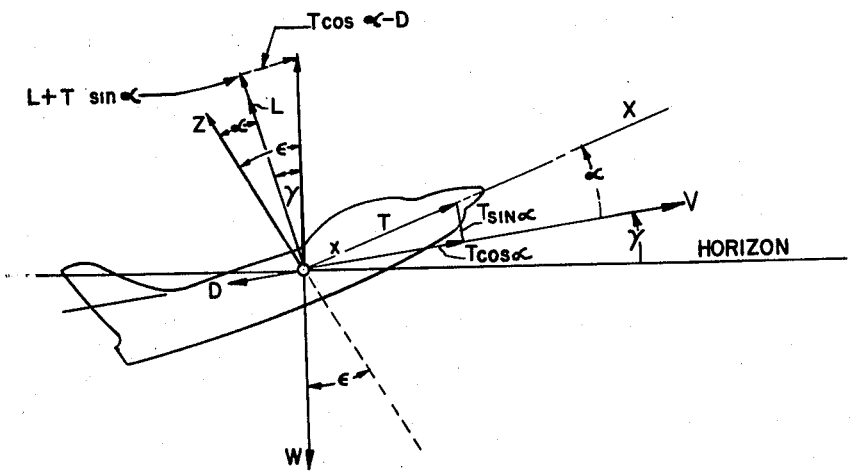
FIG. 2 is a graph illustrating in a two-axis system the forces operating on an aircraft in flight.

Referring now to FIG. 2 there is illustrated a vector diagram showing along the axes X and Z the forces on an airplane in unaccelerated flight wherein the forces are resolved with respect to the line of direction of the relative wind, which is along the axis of velocity vector V in the figure. From FIG. 2 the following equation is obtained by inspection:

$$\alpha = \epsilon - \tan^{-1}\frac{T\cos\alpha - D}{L + T\sin\alpha} \qquad (4)$$

where $\epsilon$ is the angle between the Z axis of the airplane and the gravity vector W which is the stabilized pitch attitude of the aircraft in flight. T is the thrust force acting along the X axis, D is the drag force acting along the velocity direction axis, and L is the lift force acting on the Z axis. The conditions of relative wind vector angle $\gamma$ and acceleration both equal to zero render the angle of attack $\alpha$ equal to the pitch angle $\epsilon$.

Figure 3:
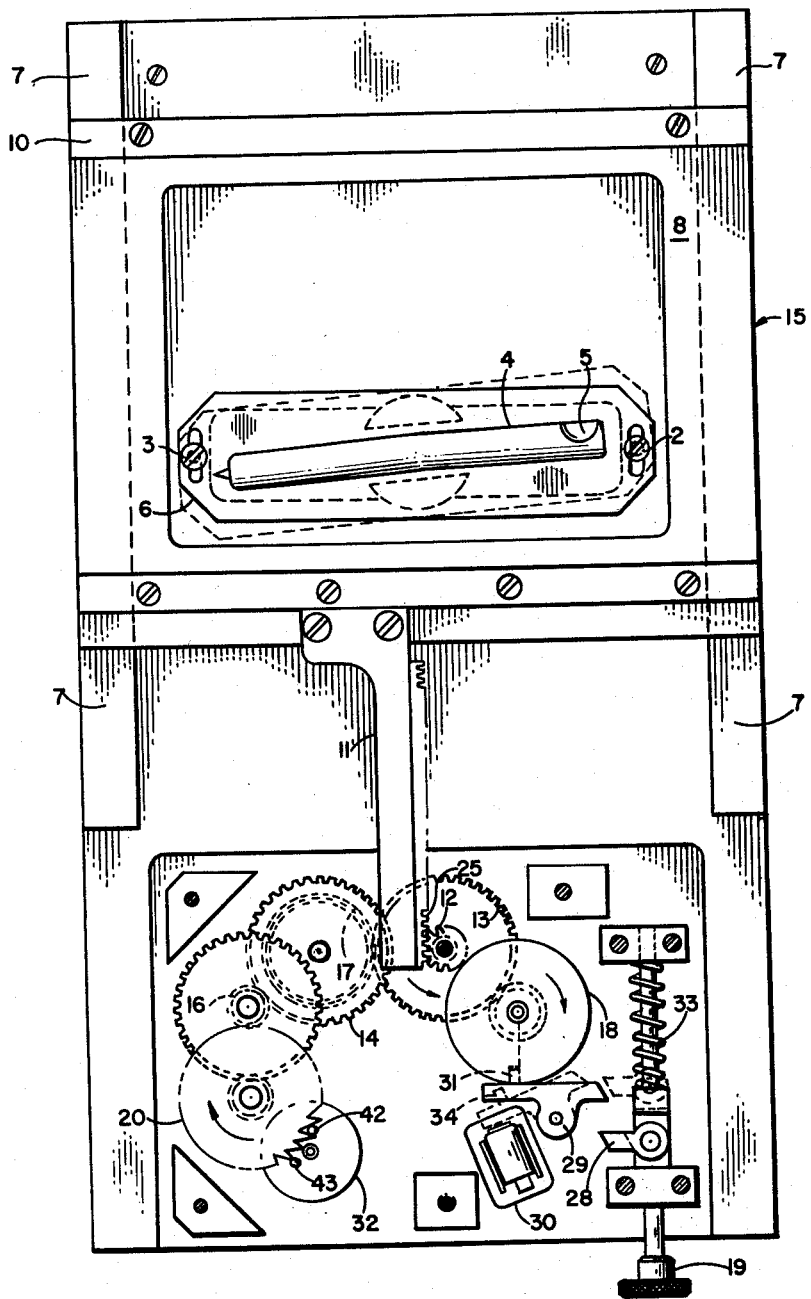
FIG. 3 is a sectional view of the calibrator apparatus of this invention.

Referring now to FIG. 3, a front view of the calibrator which measures $\epsilon$, supporting frame 15 functions as an assembly base for attaching the various components which make up the calibrator and also to support a mounting plate for positioning the calibrator in an aircraft. Mounting screws attach frame 15 to a suitable receptacle in the aircraft in a manner to be more particularly described later. A spirit level 4 having an air bubble 5 is secured to spirit level holder 6 which is rigidly mounted on the edges of a slot or hole provided in frame 15 as more clearly seen in FIG. 3. Spirit level 4 acts as a gravity reference with the gravity vector being indicated by means of bubble 5 as it moves along the level. The desired degree of damping of the bubble is obtained by variation of the size of level 4 and the viscosity of the fluid contained therein. A pair of runners or slides 7 secured to the outer edges of frame 15 are adapted to hold a platform 8 which slides up and down runners 7 in relation to spirit level 4. Film holder 9 (not shown in FIG. 3) fits in a retainer 10 which may consist of a pair of bars having suitable grooves secured to the slide 8 by screws which allow film holder 9 to slide in retainer 10. Attached to platform 8 and adapted to move platform 8 up and down the calibrator on the runners 7 in relation to spirit level 4 is a rack 11. Suitable teeth 25 on rack 11 are adapted to be engaged by pinion 12. Pinion 12 has larger gear 13 forming a part thereof. Gear 13 is meshed with the inner teeth of driving gear 14. A set of outer teeth of gear 14 is meshed with teeth of gear 16. Gears 14, 16 and 20 form a timing motor having a suitable tension spring which may comprise a spiral spring 17 suitably attached to and suitably wound around gear 14 and achieving operating tension by being locked to frame 15. Gear 20 has teeth meshed with gear 16 and controls the speed of travel of film holder 9 by means of an escapement operation. Balancing wheel 32 has a pair of pins attached to its face and adapted to mesh with teeth on the outer rim of gear 20. Pins 42 and 43 allow gear 20 to rotate in the direction shown by the arrow by means of a stepping action. Pin 42 engages the teeth of gear 20 when pin 43 is in a disengaged position. The tension on gear 20 (provided by spring 17 on gear 14) forces gear 20 in the direction shown with pin 42 disengaging from the teeth of gear 20. As soon as pin 42 disengages and gear 20 rotates a distance of one tooth, pin 43 engages the teeth, stopping motion. Then pin 43 disengages and pin 42 engages. This step by step operation continues, thereby maintaining the speed of rotation of the gears of the motor and thereby the speed of travel of film holder 9 at the desired slow pace. Knob 44 (illustrated in FIG. 4), located on the rear of frame 15, is attached to gear 14 to rewind the spring of the motor. Indexing wheel 18 has teeth meshed with the teeth of gear 13 preventing pinion 12 from being rotated by timing gear 14 until a start plunger 19 is operated.

Start plunger 19 has a protruding flange 28 operating cam 29. The upper end of cam 29 has a lug 34 fitting into detent 31 of indexing wheel 18. Compression spring 33 maintains plunger 19 and therefore cam 29 in the position wherein lug 34 fits into detent 31. When plunger 19 is pressed upward flange 28 operates on cam 29 to pull lug 34 out of detent 31, releasing indexing wheel 18 for rotation. Wheel 18 rotates one revolution, being stopped when lug 34 enters detent 31. Microswitch 30, actuated by the lower end of cam 29 upon operation of start plunger 19, controls the lighting of the bulb in the lamp to be denoted later.

Figure 4:
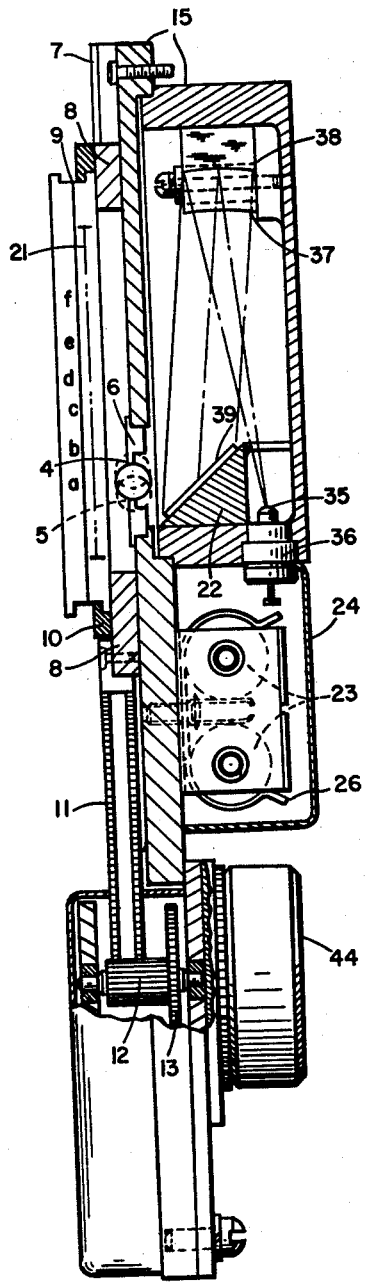
FIG. 4 is a side view of the calibrator apparatus of FIG. 3.

In FIG. 4, a side view of the device shown in FIG. 3, there is illustrated more particularly the structure which accomplishes the optical operation of the device. Film holder 9 is originally positioned in relation to spirit level 6 so that film 21 is first exposed at its lower end, denoted as $a$, light being transmitted through bubble 5. With film holder 9 in the position shown in FIG. 4 the calibrator is ready for initial operation. At the end of one exposure, platform 8 and with it film holder 9 is lowered until film 21 is exposed at its next position, denoted in FIG. 4 as $b$. Operation continues with exposures at positions $c$ through $f$.

Light for operation of the film is provided by an optical chamber comprising instrument lamp 35 which may be mounted in a suitable lamp holder 36 secured to frame 15. Spherical mirror 37 is positioned at a predetermined vertical distance from lamp 35 and is mounted in a suitable holder 38 attached to frame 15. Mirror 37 and lamp 35 are positioned so that lamp 35 is at the focus point of mirror 37. Thus, light from lamp 35 is reflected from mirror 37 as a parallel beam with a predetermined cross section. Front surface mirror 39, secured to frame 15 by a suitable mirror mount 22, is positioned relative to spherical mirror 37 so as to fold the beam of light transmitted from lamp 35 and reflected by mirror 37 and thereby transmit a beam to illuminate spirit vial 4. Vial 4 acts like a double convex cylindrical lens. Sensitized paper or film 21 in film holder 9 is masked to a narrow slot and positioned so that the bubble 5 successfully absorbs the light received from mirror 39. Thus, the image produced at the focal plane of film 21 is a curved line with a void at the position of bubble 5 (see FIG. 6). Instrument lamp 35 receives its electrical energy from a pair of penlight batteries 23 which are enclosed in a suitable battery cover 24. Springs 26 hold the batteries in position. Microswitch 30 (shown in FIG. 3) operated by the mechanism described in FIG. 3 closes the electrical circuit from batteries 23 to lamp 35 for a predetermined time.

In operation of the calibrator illustrated in FIGS. 3 and 4, initially the calibrator is loaded with sensitized paper (film 21) and mounted in the airplane. Mounting screws 2 and 3 are adjusted so that bubble 5 is approximately in a position in the vial 4 corresponding to the ground attitude of the airplane as measured across the airplane level lugs. Film 21 is in the position opposite bubble denoted as $a$ and the calibrator is now ready for precise ground calibration, effected by operation of one cycle of the timing and recording mechanism. In flight, when the pilot determines that the airplane is in a proper unaccelerated horizontal flight condition for measurement he again presses start plunger 19. Operation of start plunger 19 disengages indexing wheel 18. Rack 11 is caused to move downward by operation of the timing motor with gear 16 being rotated by means of spring 17 in conjunction with escape wheel 20 and balance wheel 32. Film holder 9 holding film 21 travels downward for a period of time determined by the operation of the timing mechanism described. The cycle commences when lug 34 disengages from detent 31 of indexing wheel 18. Cam 29 actuates microswitch 30 which switches the light in the optical system on. Film 21 is exposed to light from the optical system and records the position of spirit vial 5 during the first two seconds of the cycle. The end of cam 29 which carries lug 34 moves upward, turning off microswitch 30, when plunger 19 is released or when flange 28 passes by the other end of the cam. Film holder 9 stops when indexing wheel 18 completes one revolution, being stopped by the engagement of lug 34 in detent 31. When the pilot wishes to take a second reading he presses start plunger 19 and operation occurs as described above, with film 21 traveling between positions $a$ and $b$. Film 21 may be exposed subsequently from position $b$ through position $f$ when the film holder has reached the bottom of its travel. Knob 44 is then utilized to manually rewind the system, pushing film holder 9 to the top of its travel. Upon removal of the film and insertion of new film, operation may continue.

Figure 5:
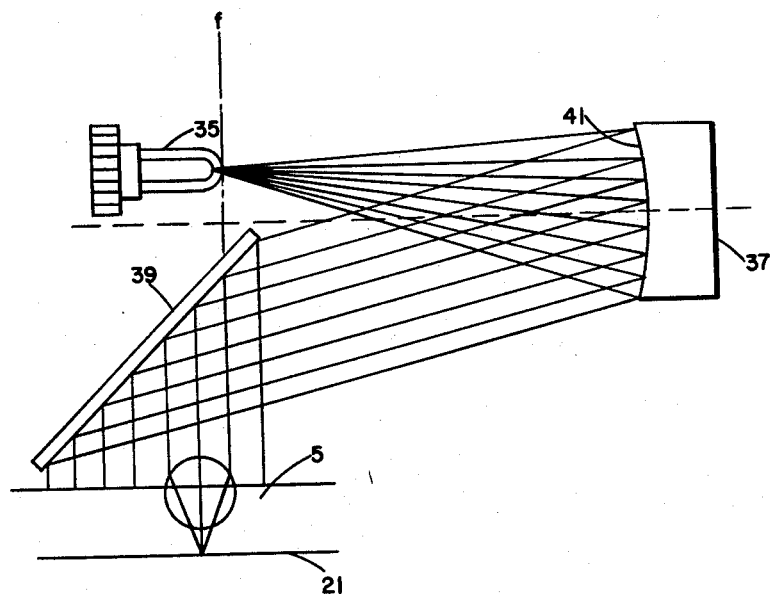
FIG. 5 is a schematic diagram illustrating the operation of the optical system of the calibrator apparatus.

Turning now to FIG. 5 there is shown a schematic diagram illustrating the operation of the optical system of this invention. Instrument lamp 35 is positioned at the focus $f$ of spherical mirror 37. Light emitted from lamp 35 is reflected from face 41 of mirror 37. The beam produced is a parallel beam having a cross section of about ½ by 3 inches. Front surface mirror 39 reflects the parallel beam at an angle so as to strike film 21 perpendicularly. Vial 5, acting as a double convex cylindrical lens, refracts light received and produces a line image at the focal plane of film 21. The image produced is therefore seen to be a curved line as shown in FIG. 6.

Figure 6:
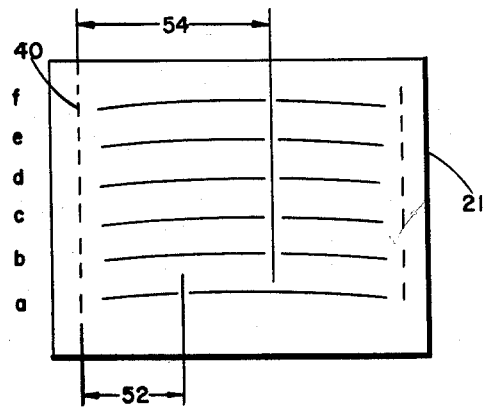
FIG. 6 illustrates a typical picture as recorded on the photosensitive paper in the calibrator.

FIG. 6 illustrates a typical picture as recorded on the film 21 of the calibrator. In FIG. 6 there is shown for illustration purposes a film 21 having six traces recorded thereon numbered $a$, $b$, $c$, $d$, $e$, and $f$. The six traces are produced during the time lamp 35 is on. Reference marks 40 are exposed at the same time so that each record is complete with a separate mark thereby eliminating the possibility of error due to relative motion between the calibrator frame 15 and the record on film 21. The voids in each horizontal trace as shown indicate the position of the bubble in the spirit vial. The bottom trace $a$ is that recorded during ground calibration and establishes a ground reference angle $\theta_G$. The actual aircraft ground attitude angle, $\alpha_{LL}$, is an angle of inclination as measured across the airplane level lugs. The airplane level lugs are two bolts mounted on the airplane in a line substantially parallel to the airplane fuselage reference line, which is also referred to as the X axis. The measured ground reference angle, $\theta_G$, as indicated by the recorded dimension 52 in FIG. 6 differs from the actual aircraft body axis ground attitude, $\alpha_{LL}$, by the amount of a bias existing in the adjusted scale of the spirit vial, caused by mounting screws 2 and 3. An average of traces (denoted by dimension 54) for the remaining five traces taken during a given trimmed flight condition determines the $\epsilon + \text{bias} = \theta_F$, wherein $\epsilon$ is the stabilized pitch attitude in such flight condition. When the angle of zero lift is being sought, for $C_L$ versus $\alpha$, the five readings may be taken at different flight conditions.

Figure 7:
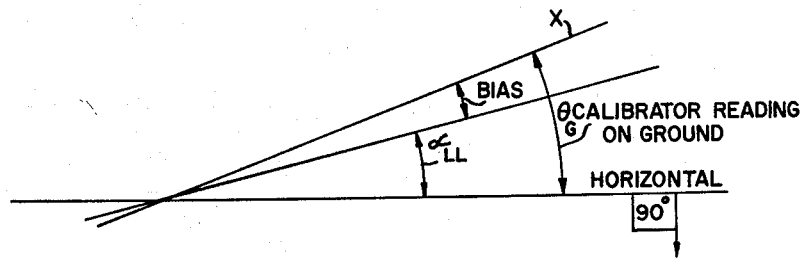
FIG. 7 is a graph illustrating the calibrator reading on the ground prior to flight.

For ground determination, illustrated graphically in FIG. 7, $\theta_G$, representing the calibration reading on the ground determined from record $a$ of FIG. 6, is utilized to determine the bias angle. Since $\theta_G = \alpha_{LL} + \text{bias}$, and $\theta_G$ and $\alpha_{LL}$ are known, the bias angle may readily be determined (where $\alpha_{LL}$ is the angle measured across the level lugs relative to the gravity vector).

Figure 8:
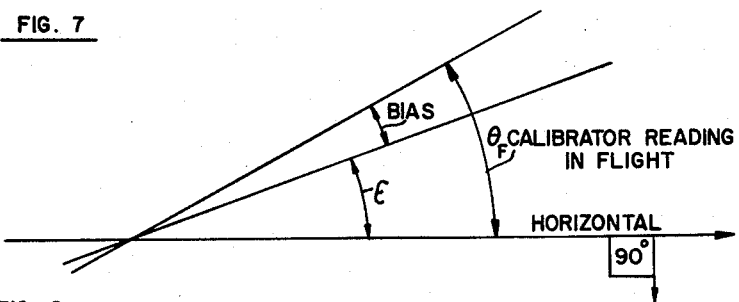
FIG. 8 is a graph illustrating the in-flight diagram of the calibrator reading.

Similarly for in-flight determination as illustrated diagrammatically in FIG. 8 and shown as records $b$, $c$, $d$, $e$, and $f$ in FIG. 6, the angle which is recorded is $\theta_F$, a stabilized pitch measurement in flight. Since $\theta_F = \epsilon + \text{bias}$, and since $\epsilon$ is assumed to be equal to $\alpha$, $\alpha$ is easily determined since bias is known from the ground determination explained above and $\theta_F$ is obtained from traces $b$ through $f$. Thus, by determining the bias angle by trace $a$ and $\theta_F$ in flight by traces $b$ through $f$, the angle of attack $\alpha$ may readily be calculated.

Although the invention has been described and illustrated in detail, it is to be clearly understood that the same is by way of illustration and example only and is not to be taken by way of limitation, the spirit and scope of this invention being limited only by the terms of the appended claims.

I claim:
1. Apparatus for recording the peformance of an aircraft in flight comprising, recording means, means for mounting said recording means in fixed relation to said aircraft, said recording means including optical means for indicating the difference between the gravity vector of said aircraft in unaccelerated flight and the gravity vector of said aircraft on the ground, light sensitive means and photographic means associated with said light sensitive means and responsive to said optical means for producing a line image on said light sensitive means which is a reproduction of the difference indication of said optical means, said optical means comprising an elongated spirit level having a circular cross section.
2. Apparatus for determining the angle of attack of an airplane in flight as a function of the zero lift coefficient comprising recording means, means for mounting said recording means in fixed relation to said aircraft, said recording means comprising a frame, means for mounting said frame on said aircraft, level gauge means comprising an elongated spirit level having a circular cross section and a transparent bubble adapted to move along said spirit level as said gauge means tilts with respect to a reference line, said level gauge means being mounted on said frame whereby said reference line is the fuselage reference line of said aircraft, light sensitive means slidably attached to said frame, means for moving said light sensitive means on said frame with respect to said level gauge means, and photographic means attached to said frame and disposed relative to said level gauge means and said light sensitive means for producing a line image of said spirit level on said light sensitive means, said line image havng a space at the position of said bubble.
3. Apparatus for determining the angle of attack of an airplane in flight as a function of the zero lift coefficient comprising recording means, said recording means comprising a frame, means for mounting said frame in fixed relation to said aircraft, a spirit level comprising an elongated vial having a circular cross section and having an air bubble adapted to move in a fluid within said vial as said level tilts, said level mounted on said frame whereby said level is in fixed geometrical relationship with the fuselage reference axis of said aircraft, a film holder slidably attached to said frame and adapted to move with respect to said spirit level, a film located in said said film holder opposite said spirit level, motor means for moving said film holder vertically with respect to said spirit level, said motor means including timing means to control the speed of movement of said film holder, and photographic means attached to said frame and disposed relative to said spirit level and said film for producing a line image of said vial on said film, said line image having a space at the position of said bubble.

References Cited in the file of this patent

UNITED STATES PATENTS

| | | |
|---|---|---|
| 1,302,580 | Nelson | May 6, 1919 |
| 1,833,889 | Carleton et al. | Dec. 1, 1931 |
| 1,960,038 | Williston et al. | May 22, 1934 |
| 2,512,670 | Mullins | June 27, 1950 |
| 2,551,338 | Rogers | May 1, 1951 |
| 2,687,507 | Schonstedt | Aug. 24, 1954 |

FOREIGN PATENTS

| | | |
|---|---|---|
| 965,967 | France | Feb. 22, 1950 |